(12) United States Patent
Hasegawa et al.

(10) Patent No.: US 9,620,157 B2
(45) Date of Patent: Apr. 11, 2017

(54) ENCODING INFORMATION ON TAPE USING WRITE OFFSET GAPS

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/837,116

(22) Filed: Aug. 27, 2015

(65) Prior Publication Data

US 2017/0061996 A1    Mar. 2, 2017

(51) Int. Cl.
| | | |
|---|---|---|
| G11B 15/18 | (2006.01) | |
| G11B 5/48 | (2006.01) | |
| G11B 5/008 | (2006.01) | |
| G11B 15/087 | (2006.01) | |
| G11B 5/588 | (2006.01) | |
| G11B 5/584 | (2006.01) | |
| G11B 15/00 | (2006.01) | |
| G11B 15/093 | (2006.01) | |

(52) U.S. Cl.
CPC ........ G11B 5/4893 (2013.01); G11B 5/00813 (2013.01); *G11B 5/584* (2013.01); *G11B 5/588* (2013.01); *G11B 15/005* (2013.01); *G11B 15/087* (2013.01); *G11B 15/093* (2013.01)

(58) Field of Classification Search
None
See application file for complete search history.

(56) References Cited

U.S. PATENT DOCUMENTS

| | | | | | |
|---|---|---|---|---|---|
| 5,629,813 | A | * | 5/1997 | Baca .................... | G11B 5/5508 360/77.12 |
| 5,870,244 | A | * | 2/1999 | Yokomachi .......... | G11B 5/4893 360/77.14 |
| 5,946,159 | A | * | 8/1999 | Chliwnyj ............... | G11B 5/584 360/77.12 |
| 6,101,061 | A | * | 8/2000 | Goker ................. | G11B 5/5504 360/51 |

(Continued)

FOREIGN PATENT DOCUMENTS

JP    2004152347 A    5/2004

*Primary Examiner* — Tan X Dinh
(74) *Attorney, Agent, or Firm* — James H. Mayfield

(57) ABSTRACT

As disclosed herein a method for encoding information on tape using write offset gaps. The method includes receiving a request to write a dataset on a tape medium using a plurality of head groups, and identifying information to be encoded when writing the dataset. The method further includes determining a head group offset pattern that encodes the information, and writing the dataset using the head group offset pattern. Also disclosed herein is a method for decoding information on tape using write offset gaps. The method includes reading a dataset from a tape medium using a plurality of head groups, and determining a head group offset pattern used to read the dataset. The method further includes decoding information encoded in the head group offset pattern to provide decoded information. A computer program product corresponding to the above method is also disclosed herein.

3 Claims, 5 Drawing Sheets

(56) References Cited

U.S. PATENT DOCUMENTS

| | | | | |
|---|---|---|---|---|
| 6,462,899 B1* | 10/2002 | Chliwnyj | ............... | G11B 5/584 360/77.12 |
| 6,831,806 B2* | 12/2004 | Chliwnyj | ............... | G11B 5/584 360/77.12 |
| 6,833,973 B2* | 12/2004 | Chliwnyj | ............... | G11B 5/584 360/77.12 |
| 6,839,197 B2* | 1/2005 | Chliwnyj | ............... | G11B 5/584 360/77.12 |
| 6,842,304 B2* | 1/2005 | Chliwnyj | ............... | G11B 5/584 360/261.1 |
| 6,865,043 B2 | 3/2005 | Ataku et al. | | |
| 6,865,052 B2* | 3/2005 | Chliwnyj | ............... | G11B 5/584 360/77.12 |
| 7,299,146 B2* | 11/2007 | Chliwnyj | ............... | G11B 5/584 702/106 |
| 2002/0167753 A1* | 11/2002 | Basham | ................ | G11B 5/584 360/77.12 |
| 2005/0231845 A1* | 10/2005 | Shirouzu | ................ | G11B 15/07 360/48 |

* cited by examiner

ENCODING INFORMATION ON TAPE USING WRITE OFFSET GAPS

BACKGROUND

The present invention relates to reading and writing data on a tape storage medium, and more particularly to encoding information on a tape storage medium using write offset gaps.

A tape drive is a data storage device that reads and writes data on a magnetic tape storage medium. Tape storage is typically used for offline backup and archival of data, meaning data is written to a tape, and the tape is removed (e.g., un-mounted) from the tape drive and stored in a tape library. If the data on the tape is needed at a later time (e.g., restoring lost or corrupted data), the tape may be re-mounted on a tape drive and the data restored to a storage medium (e.g., disk storage).

Data may be written to, or read from, a tape in segments called datasets. When writing a dataset on a tape, the tape drive may use multiple heads (e.g., 16, or 32 heads), and each head writes a portion of the dataset (e.g., with 32 write heads, each head writes ~1/32 of the dataset). When reading a dataset from tape, heads function similarly, with each head reading a portion of the dataset (e.g., with 32 read heads, each head reads ~1/32 of the dataset). The number of heads used differs according to the format of a tape medium and the tape drive.

SUMMARY

As disclosed herein, a method for encoding information on tape using write offset gaps includes receiving a request to write a dataset on a tape medium using a plurality of head groups, and identifying information to be encoded when writing the dataset. The method further includes determining a head group offset pattern that encodes the information, and writing the dataset using the head group offset pattern.

As disclosed herein, a method for decoding information on tape using write offset gaps includes reading a dataset from a tape medium using a plurality of head groups, and determining a head group offset pattern used to read the dataset. The method further includes decoding information encoded in the head group offset pattern to provide decoded information.

A computer program product for encoding information on tape using write offset gaps is disclosed herein. The computer program product includes one or more computer readable storage media and program instructions stored on the one or more computer readable storage media. The program instructions include instructions to receive a request to write a dataset on a tape medium using a plurality of head groups, and identify information to be encoded when writing the dataset. The program instruction further include instructions to determine a head group offset pattern that encodes the information, and write the dataset using the head group offset pattern.

DETAILED DESCRIPTION

A tape storage medium (hereinafter, tape) is a sequential access removable media device. A tape drive writes data sequentially on a tape. When data is read from a tape, the data is read sequentially, as opposed to the random order in which data may be accessed on a disk drive storage medium. When searching for specific data stored on a storage medium, a disk drive can move to any position on the disk in only a few milliseconds, where as a tape drive requires time (e.g., perhaps many seconds) to physically wind tape between reels to located a particular piece of data. As a result, tape drives may have very slow average seek times to locate data.

Errors may occur when a tape drive is attempting to read a tape. One tape drive may write data to a tape. Later a different tape drive may read the data from the tape. Tape drives may operate at different speeds, however, the read operation may fail if the read and write operations are performed at different tape speeds. If the tape is scratched, the write operation may skip a portion of the tape to avoid the scratch, however a read operation may not be aware of the scratch and skipped tape, and the scratch may cause a read error for the dataset being read. The drive may make several attempts to re-read the dataset in error before it determines the proper tape speed or starting read location.

It has been observed that when a read error occurs during a tape read operation, there may be many repetitive attempts to read the dataset in error before a successful read is achieved. The repetitive read attempts increase the time required to read data from a tape. The embodiments disclosed herein generally address the above-described problems.

Figure 1:
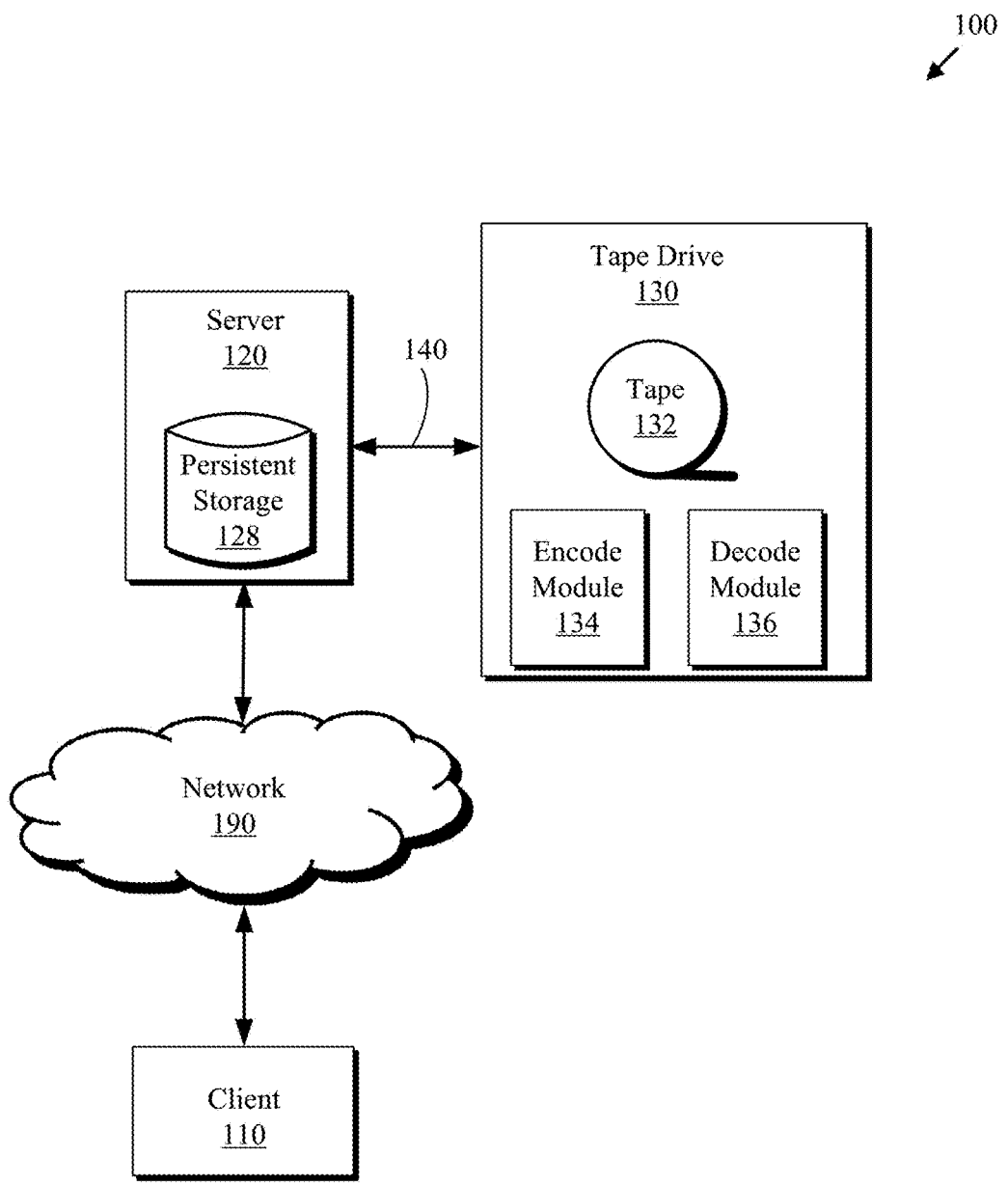
FIG. 1 is a functional block diagram depicting a computing environment, in accordance with at least one embodiment of the present invention.

The present invention will now be described in detail with reference to the Figures. FIG. 1 is a functional block diagram depicting a computing environment 100 in accordance with at least one embodiment of the present invention. Computing environment 100 includes a client 110 and a server 120 which can be smart phones, tablets, desktop computers, laptop computers, specialized computer servers, or any other computer systems, known in the art, capable of communicating over network 190. In general, client 110 and server 120 are representative of any electronic devices, or combination of electronic devices, capable of executing machine-readable program instructions, as described in greater detail with regard to FIG. 5.

Server 120 may be a computing device providing services to client 110. Server 120 may be, for example, a database server, file server, mail server, print server, web server, gaming server, or application server. In some embodiments, client 110 is accessing a web based banking application that is hosted by server 120. In other embodiments, server 120 is a mail server providing client 110 with an email service. In yet other embodiments, server 120 is a database server providing database services to client 110.

As depicted, server 120 is connected to a tape drive 130 over connection 140. Connection 140 may be a SCSI, a Fibre Channel, SATA, USB, FireWire, FICON™, or any other connection interface familiar to those of skill in the art. Tape drive 130 may be a data storage device that reads and writes sequential data on a magnetic tape storage medium, such as tape 132. Tape 132 may be any of differing physical configurations, such as, for example, a reel, a cassette, or a cartridge that are able to be mounted and removed from tape drive 130. Tape 132 may be comprised of one or more tapes stored in a tape library.

Tape drive 130 also includes encode module 134, and decode module 136. Tape drive 130 may have multiple read/write heads (e.g., 8, 16 or 32 heads) used to perform read and write operations. In some embodiments, tape drive 130 has 32 heads that are numbered from head-0 through head-31. In other embodiments, tape drive 130 has 16 heads that are numbered from head-0 through head-15.

Encode module 134 may be configured to encode information on tape 132 using write offset gaps when writing data to tape 132. A write offset gap may be the difference in distance of the starting write location of one head when compared to the stating write location of a reference head. By intentionally creating a write gap corresponding to each write head and associating a meaning with each gap, information may be encoded during a write operation. In some embodiments, head-0 is the reference head, and is assigned an offset value of zero. In other embodiments, head-31 is the reference head, and is assigned an offset value of zero. The type of information that may be encoded, and offset encoding format used by encode module 134 may be predetermined so that decode module 136 will be able to decode the data. The offset encoding format may define the gap size and the number of gaps recognized during the write operation.

The heads on tape drive 130 may be logically divided into groups, known as head groups, and each head in a head group may be configured to start reading or writing at the same location. In some embodiments, tape drive 130 has 32 heads divided into eight groups, and each group contains the heads corresponding to the remainder when dividing the head number (e.g. head-0, head-1, head-23, etc.) by the number of groups. For example, head group 0 would contain {head-0, head-8, head-16, and head-24}, and head group 7 would contain {head-7, head-15, head-23, and head-31}. In other embodiments, tape drive 130 has 32 heads divided into eight groups and the groups are divided sequentially. For example, head group 0 would contain {head-0, head-1, head-2, and head-3}, and head group 7 would contain {head-28, head-29, head-30, and head-31}).

When heads are divided into head groups, each head in a group will have the same starting write position. Consequently, if 32 write heads are divided into eight head groups, then there are only eight unique head positions possible. For example, head group 0 may contain {head-0, head-8, head-16, and head-24}, and all four heads would start in the same gap (e.g., gap 0), while head group 2 may contain {head-2, head-10, head-18, and head-26} and all four heads would start in the same gap (e.g., gap 1). As a result, heads 0-7 would contain the same gap pattern as heads 8-15, 16-23, and 24-31.

When encoding information, the amount of gap either preceding or following a specific head (e.g., head-1) and the reference head (e.g., head-0) may correspond to a binary value. The binary values can be used to encode information using the write offset gaps. The encoded information may be useful when reading the data on the tape. In some embodiments, the encoded information includes: (i) indicating whether error recovery parameters are encoded (ii) a starting read position of a previous dataset; (iii) a current tape speed; and (iv) a current channel setting. In another embodiment, the encoded information includes an encryption key ID to identify an encryption key that is required to read encrypted data. In yet another embodiment, the encoded information identifies a location of an address map for data stored on tape 132. An example of data written using write offset gaps will be described in detail with regard to FIG. 4.

Decode module 136 may be configured to decode information when reading a dataset from tape 132. Decode module 136 uses the same offset encoding format used when the data was written. Decode module 136 also identifies the head groups using the same grouping method as was used by encode module 134. Assigning multiple heads in a head group allows sync position information identified by one head in the group to be used to assign the same starting read location for each head in the head group. Once tape drive 130 has determined the starting read position of each head, decode module 136 may use the gap offset between each head group and the reference head group to determine the encoded binary value. In some embodiments, the binary value provides information to assist with a read error of a previous dataset. In other embodiments, the binary value identifies the location of an encryption key required to read data.

As depicted, server 120 includes persistent storage 128 which may include important production data that is vital to the daily activities of an organization (e.g., the data in a database). In some embodiments, tape drive 130 and tape 132 perform a backup of data stored on persistent storage 128. In other embodiments, server 120 accesses tape drive 130 and tape 132 to recover lost or corrupted data from backup data stored on tape 132.

In the depicted embodiment, client 110 and server 120 are separate computers, however, in other embodiments, client 110 and server 120 may coexist on a single computer. In yet other embodiments, client 110 and server 120 are procured from a cloud environment.

Persistent storage 128 may be any non-volatile storage media known in the art. For example, persistent storage 128 can be implemented with a tape library, optical library, one or more independent hard disk drives, or multiple hard disk drives in a redundant array of independent disks (RAID). Similarly, data on persistent storage 128 may conform to any suitable storage architecture known in the art, such as a file, a relational database, an object-oriented database, and/or one or more tables.

Client 110, server 120, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between client 110 and server 120 in accordance with an embodiment of the present invention.

Figure 2:
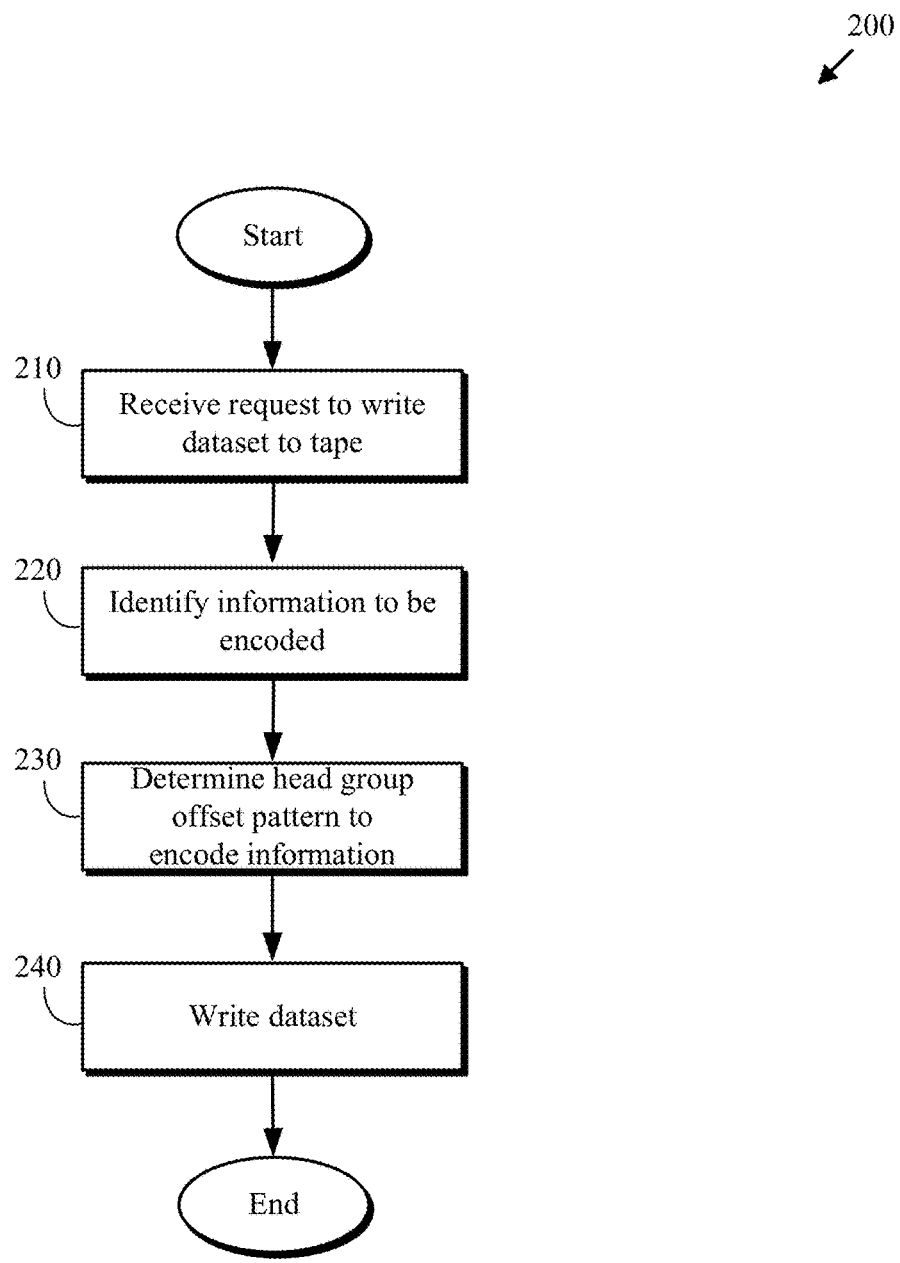
FIG. 2 is a flowchart depicting an encoding write method, in accordance with at least one embodiment of the present invention.

FIG. 2 is a flowchart depicting an encoding write method 200, in accordance with at least one embodiment of the present invention. As depicted, encoding write method 200 includes receiving (210) a write request, identifying (220) the information to be encoded, determining (230) the head group offset pattern, and writing (240) the dataset. Encoding write method 200 enables tape drive 130 to write data to tape 132 and encode additional information on tape 132 using write offset gaps.

Receiving (210) a write request may include tape drive 130 receiving a request to write data to a specific tape volume (e.g., tape 132). In response thereto, tape drive 130 may request that tape 132 be mounted (i.e., request that tape 132 is placed on tape drive 130). The write request may come from any computing device (such as server 120) attached to tape drive 130 over connection 140.

Identifying (220) the information to be encoded may include tape drive 130 determining what information is to be encoded on tape 132. The type of information to be represented by the encoding operations may have been predetermined. In some embodiments, the information is parameters corresponding to an error recovery procedure (ERP) used to recover from a dataset read error. In other embodiments, the information is an encryption key required to read encrypted data.

Determining (230) the head group offset pattern may include tape drive 130 encoding the information identified (during identify operation 210) in a binary string. A head group offset pattern is a gap pattern that represents a binary string corresponding to information to be encoded. After the information to be encoded has been identified, the information may be organized in a predetermined order, and then represented as a binary string. For example, if the first piece of information indicates a tape speed value of '12' (of possible values 0-14), then '12' would be represented as the binary string '1100'. The head group offset pattern is the gap pattern that represents the binary string corresponding to the identified information.

The head group offset pattern may be dependent on the number of head groups defined and the offset encoding format. The offset encoding format may determine how much information can be encoded by a single head group. In some embodiments, the offset encoding format only recognizes two gaps (i.e., two starting write positions), and therefore the gap can represent one of only two values—either zero or one in binary format (e.g., '0' or '1'). In some other embodiments, the offset encoding format recognizes four gaps (i.e., four starting write positions), and therefore the gap can represent one of four values—zero, one, two, or three in binary format (e.g., '00', '01', '10', or '11').

Writing (240) the dataset may include tape drive 130 writing a synchronization pattern on the tape medium for each head group. The synchronization pattern for each head group is offset on the tape medium according to the head group offset pattern as determined during the determining operation 230. After the synchronization pattern is successfully written for each write head, tape drive 130 writes the data corresponding to the request to tape 132. In some embodiments, encode module 134 is configured to execute encoding write method 200. In other embodiments, encode module 134 executes on tape drive 130. In some other embodiments, encode module 134 executes on a server, such as server 120.

Figure 3:
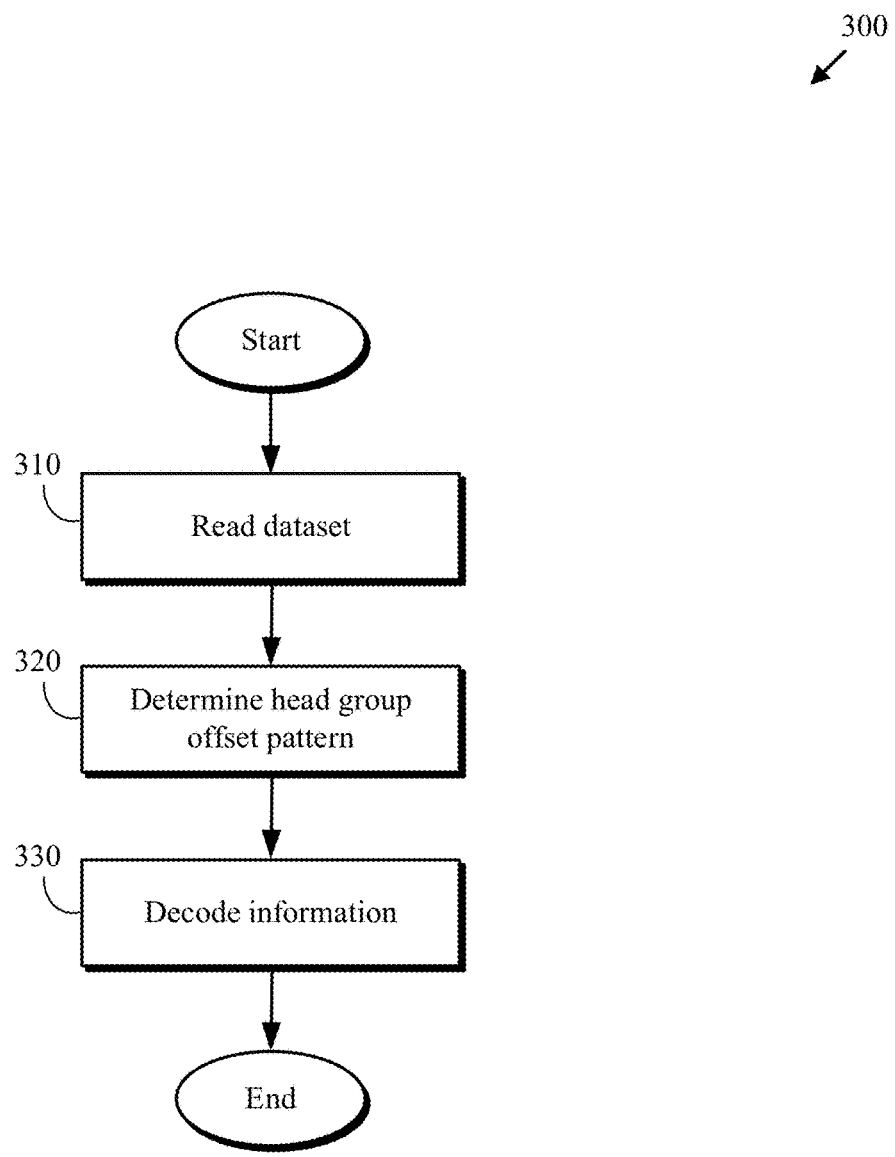
FIG. 3 is a flowchart depicting a decoding read method, in accordance with at least one embodiment of the present invention.

FIG. 3 is a flowchart depicting a decoding read method 300, in accordance with at least one embodiment of the present invention. As depicted, decoding read method 300 includes reading (310) a dataset, determining (320) the head group offset pattern, and decoding (330) the information. Decoding read method 300 enables tape drive 130 to read data on tape 132 and decode additional information on tape 132 using write offset gaps.

Reading (310) a dataset may include tape drive 130 determining a starting read location for each read head on tape 132, and then detecting a synchronization pattern on tape 132 corresponding to each read head. The read heads may be logically divided into head groups, with each head group including one or more read heads. The read operation uses the same procedure for creating the head groups and the same offset encoding format that was used by encoding write method 200 to write the data to tape 132.

Determining (320) the head group offset pattern may include tape drive 130 identifying the write offset gaps corresponding to each head group. The head group offset pattern is dependent on the number of head groups defined, and the offset encoding format (i.e., the number of write offset gaps that are recognized). The offset encoding format (as described in the determining operation 230 of FIG. 2) may determine how much information can be encoded by a single head group. The gap position of each head group, relative to the reference head group (e.g., head group 0), may be used to identify a binary pattern. The binary pattern associated with each head group may be concatenated to produce the head group offset pattern. The number of bits of information available in the head group offset pattern is dependent on the number of head groups, and the offset encoding format. For example, if there are eight head groups and the offset encoding format recognizes 4 gaps, then there would be 14 bits available in the head group offset pattern. Head group 0 is the reference group (i.e., always starts in gap zero, and has a value of '00'), and the remaining seven groups can represent two bits of information each. In some embodiments, the binary string corresponding to the head group offset pattern contains the binary value corresponding to all head groups (including the reference head group); furthermore, the portion of the binary string corresponding to the reference head group is ignored. In other embodiments, the binary value corresponding to the reference head group is not included in the binary string corresponding to the head group offset pattern.

Decoding (330) the information may include tape drive 130 parsing the binary string represented by the head group offset pattern according to a predetermined parsing pattern. In some embodiments, the encoded information includes: (i) an indicator that indicates whether error recovery parameters are encoded; (ii) a starting read position of a previous dataset; (iii) the tape speed used to write the dataset; and (iv) the channel setting used to write the dataset. In another embodiment, the encoded information identifies an encryption key ID that is required to read encrypted data. In yet another embodiment, the encoded information identifies a location of an address map for data stored on tape 132.

Figure 4:
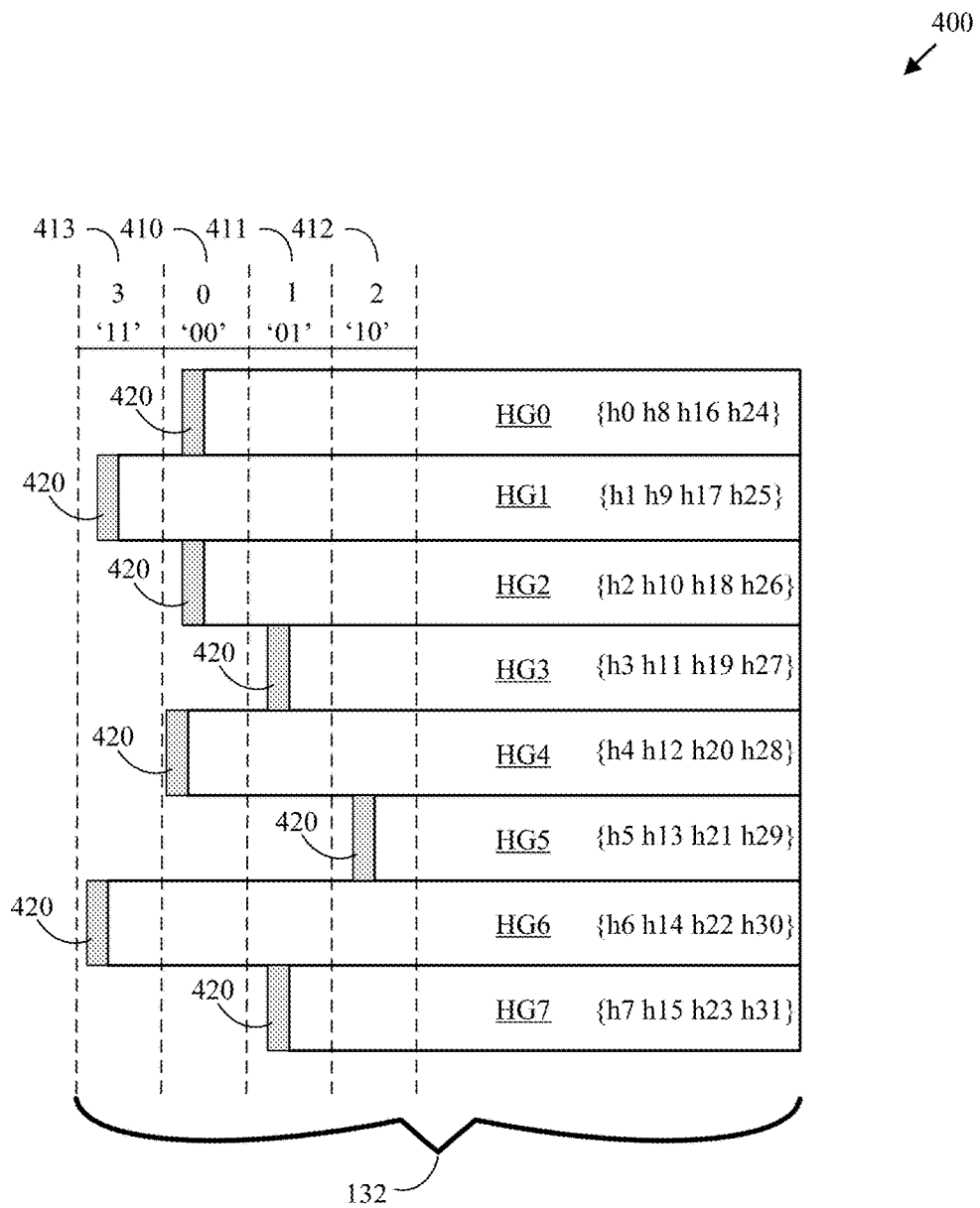
FIG. 4 depicts an example of data written using write offset gaps, in accordance with at least one embodiment of the present invention.

FIG. 4 depicts example data 400 written using write offset gaps, in accordance with at least one embodiment of the present invention. Example data 400 depicts a section of tape 132 with data written on the tape using 32 write heads (named h0-h31). The procedure implemented by tape drive 130 (not shown) to encode information using write offset gaps includes: (i) logically dividing the 32 heads into 8 head groups (named HG0-HG7); (ii) determining the content of each group by using the remainder when the head number is divided by eight (e.g., h0/8=0 so h0 is in HG0, h1/8=1 h1 is in HG1, . . . , h31/8=7 so h31 is in HG7); (iii) recognizing four gaps (410, 411, 412, and 413) using an offset encoding format; and (iv) identifying the reference head group (HG0). Each gap (410, 411, 412, and 413) represents a different two bit string. For example, gap 0 (410) represents the binary string '00', gap 1 (411) represents the binary string '01', gap 2 (412) represents the binary string '10', and gap 3 (413) represents the binary string '11'.

Prior to writing any data to tape 132, a binary string that is to be encoded using write offset gaps must be identified. The head group offset pattern can be determined based on the identified binary string. In the depicted example, there are 8 head group (HG0-HG7), each capable of representing 2 bits of encoded data. Head group zero (HG0) is the reference group, and therefore will always be located at gap 0 (410) and cannot be used to encode data. The remaining seven head groups (HG1-HG7) can encode 14 bits of data. In the depicted example, HG0-HG7 represent the binary string '0011000100101100'. In the depicted example, the binary string may represent the following data: (bits 1-2) '00'—reference head identifying the location of gap 0; (bit 3) '1'—is encoded data present; (bits 4-5) '10'—tape speed at write time; (bits 6-8) '001'—communication channel in use at write time; and (bits 9-16) '00101100'—offset to location of state of previous dataset.

After the binary string is identified, and the head group offset pattern is determined, the write operation may begin. Prior to writing the actual data corresponding to the write request, each head identifies the starting write location of the head by placing a synchronization pattern 420 on tape 132. Synchronization pattern 420 may identify the starting read location during a read operation. During a read operation, synchronization pattern 420 may also allow tape drive 130 to identify the write gaps and decode the data that was encoded during the write operation.

Figure 5:
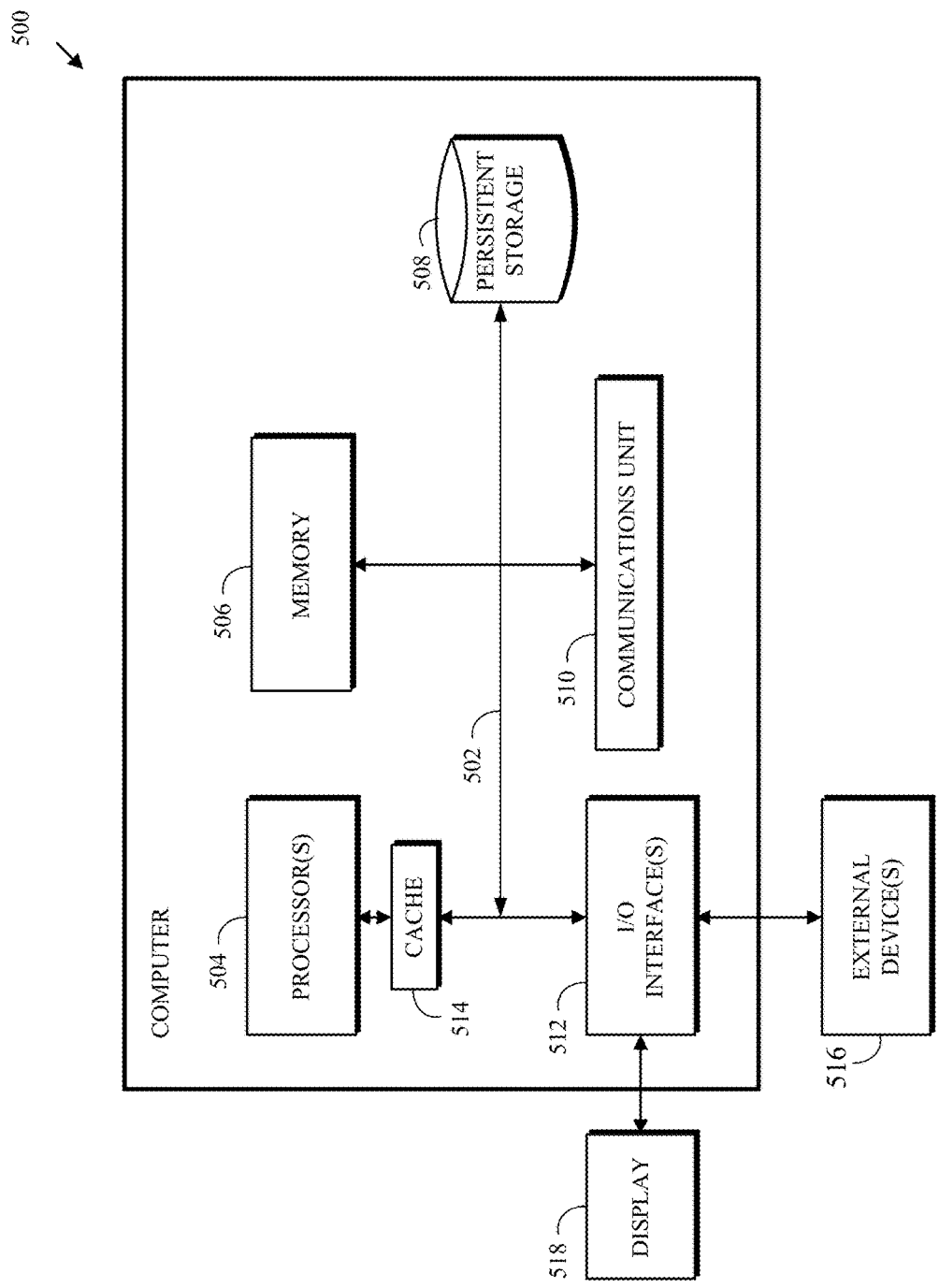
FIG. 5 is a block diagram depicting various components of one embodiment of a computer suitable for executing the methods disclosed herein.

FIG. 5 depicts a block diagram of components of a computer system 500, which is an example of systems such as client 110 and server 120 within computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Client 110 and server 120 include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., encoding write method 200 and decoding read method 300 are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of client 110 and server 120. In these examples, communications unit 510 includes one or more network interface cards. Communications unit 510 may provide communications through the use of either or both physical and wireless communications links. Program instructions and data used to practice embodiments of encoding write method 200 and decoding read method 300 may be downloaded to persistent storage 508 through communications unit 510.

I/O interface(s) 512 allows for input and output of data with other devices that may be connected to each computer system. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    receiving a request to write a dataset on a tape medium using a plurality of head groups;
    identifying information to be encoded when writing the dataset;
    determining a head group offset pattern that encodes the information;
    writing the dataset using the head group offset pattern; and
    writing a synchronization pattern on the tape medium for each head group, wherein the synchronization pattern for each head group is offset on the tape medium according to the head group offset pattern.

2. A method comprising:
    receiving a request to write a dataset on a tape medium using a plurality of head groups;
    identifying information to be encoded when writing the dataset;
    determining a head group offset pattern that encodes the information, wherein the head group offset pattern indicates whether error recovery parameters are encoded therein; and
    writing the dataset using the head group offset pattern.

3. A method comprising:
    reading a dataset from a tape medium using a plurality of head groups;
    determining a head group offset pattern used to read the dataset, wherein the head group offset pattern indicates whether error recovery parameters are encoded therein; and
    decoding information encoded in the head group offset pattern to provide decoded information.

* * * * *